US011366843B2

(12) United States Patent
Maier et al.

(10) Patent No.: US 11,366,843 B2
(45) Date of Patent: Jun. 21, 2022

(54) DATA CLASSIFICATION (71) Applicant: INTERNATIONAL BUSINESS MACHINES CORPORATION, Armonk, NY (US)

(72) Inventors: Albert Maier, Tuebingen (DE); Martin Oberhofer, Bondorf (DE); Yannick Saillet, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 448 days.

(21) Appl. No.: 16/391,353

(22) Filed: Apr. 23, 2019

(65) Prior Publication Data

US 2019/0251107 A1     Aug. 15, 2019

Related U.S. Application Data (63) Continuation of application No. 15/801,336, filed on Nov. 2, 2017.

(51) Int. Cl.
*G06F 16/35* (2019.01)
*G06K 9/62* (2022.01)
(Continued)

(52) U.S. Cl.
CPC .......... *G06F 16/35* (2019.01); *G06F 16/3334* (2019.01); *G06F 16/367* (2019.01); *G06F 40/247* (2020.01); *G06K 9/6267* (2013.01)

(58) Field of Classification Search
None
See application file for complete search history.

(56) References Cited

U.S. PATENT DOCUMENTS 6,198,770 B1    3/2001  Kondo
7,043,488 B1    5/2006  Baer et al.
(Continued)

FOREIGN PATENT DOCUMENTS

WO    2017002028 A1    1/2017

OTHER PUBLICATIONS

Aisbett, Janet et al. "Cognitive Classification" AAAI.org; AAAI-99 Proceedings; 1999; retrieved from Internet: https://www.aaai.org/Papers/AAAI/1999/AAAI99-015.pdf; 8 pgs.
(Continued)

*Primary Examiner* — Pierre M Vital
*Assistant Examiner* — Andalib F Lodhi
(74) *Attorney, Agent, or Firm* — Cantor Colburn LLP; John Noh (57) ABSTRACT The invention relates to a computer-implemented method for classifying a set of data values. For each of the data values of the set of data values, a set of one or more terms associated with the respective data value is determined using one or more first knowledge bases. A set of common terms is determined. The set of common terms comprises terms present in more than one of the sets of terms. For each of the common terms, a number of hits for a lookup query against one or more second knowledge data bases is determined. One or more common terms of the set of common terms with the smallest number of hits are determined and a result is returned. The result comprises the one or more common terms with the smallest number of hits as one or more candidate classes for classifying the set of data values.

10 Claims, 4 Drawing Sheets

(51) Int. Cl.
  *G06F 16/36* (2019.01)
  *G06F 16/33* (2019.01)
  *G06F 40/247* (2020.01)

(56) References Cited

U.S. PATENT DOCUMENTS

| | | |
|---|---|---|
| 7,987,144 B1 | 7/2011 | Drissi et al. |
| 8,165,972 B1 * | 4/2012 | Forman ............... G06F 16/3338 706/12 |
| 9,171,057 B2 | 10/2015 | Botros |
| 9,292,704 B2 | 3/2016 | Ueno |
| 9,324,022 B2 | 4/2016 | Williams, Jr. et al. |
| 10,331,738 B2 * | 6/2019 | Ricker ................. H04N 21/232 |
| 2005/0256866 A1 | 11/2005 | Lu et al. |
| 2006/0074907 A1 | 4/2006 | Singhal et al. |
| 2006/0136467 A1 | 6/2006 | Avinash et al. |
| 2006/0253409 A1 * | 11/2006 | Ronkainen ............ G06F 16/951 |
| 2008/0104141 A1 * | 5/2008 | McMahon ............ G06F 40/197 |
| 2009/0248671 A1 * | 10/2009 | Maruyama ........... G06F 16/353 |
| 2012/0066214 A1 | 3/2012 | Nelke et al. |
| 2013/0091421 A1 | 4/2013 | Dallari et al. |
| 2013/0166530 A1 | 6/2013 | Pilat et al. |
| 2017/0293622 A1 * | 10/2017 | Miller ............... G06F 16/24578 |
| 2017/0293685 A1 | 10/2017 | Miller et al. |

OTHER PUBLICATIONS

IBM "List of IBM Patents or Patent Applications Treated as Related"; Date Filed: Apr. 23, 2019, 2 pages.

Maier, Albert et al., "Data Classification" U.S. Appl. No. 15/801,336, filed Nov. 2, 2017.

Panickar, Abhilash et al. "Method and System for Classifying Large Data Using Machine Learning Algorithms", ip.com Disclosure No. IPCOM000233324D; published Dec. 6, 2013; retrieved from Internet: http://priorart.ip.com/IPCOM/000233324; 2 pgs.

* cited by examiner

DATA CLASSIFICATION

DOMESTIC PRIORITY

This application is a continuation application of the legally related U.S. Ser. No. 15/801,336 filed Nov. 2, 2017, the contents of which are incorporated by reference herein in their entirety.

BACKGROUND

The present disclosure relates to the field of electronic data processing and, more specifically, to a computer-implemented method for classifying a set of data values.

Being able to classify data values, i.e. to determine a domain of the respective data values, may be important for an understanding of the data values as well as for data governance. The class of a set of data values may be used for determining the policies to be applied on the respective data values. Based on the class it may e.g. be decided how, where, when and/or by whom the respective data values are to be further processed. Hence, there is a constant need to improve the performance of data classification

SUMMARY

Various embodiments provide a method for classifying a set of data values, a computer program product and a computer system for executing the method as described by the subject matter of the independent claims. Advantageous embodiments are described in the dependent claims. Embodiments of the present invention can be freely combined with each other if they are not mutually exclusive.

In one aspect, the invention relates to a computer-implemented method for classifying a set of data values. For each of the data values of the set of data values, a set of one or more terms associated with the respective data value is determined using one or more first knowledge bases. A set of common terms is determined. The set of common terms comprises terms present in more than one of the sets of terms. For each of the common terms, a number of hits for a lookup query against one or more second knowledge data bases is determined. One or more common terms of the set of common terms with the smallest number of hits are determined and a result is returned. The result comprises the one or more common terms with the smallest number of hits as one or more candidate classes for classifying the set of data values.

In a further aspect, the invention relates to a computer program product comprising a non-volatile computer-readable storage medium having computer-readable program code embodied therewith. The computer-readable program code is configured to implement a method for classifying a set of data values, when it is executed by a computer system. For each of the data values of the set of data values, a set of one or more terms associated with the respective data value is determined using one or more first knowledge bases. A set of common terms is determined. The set of common terms comprises terms present in more than one of the sets of terms. For each of the common terms, a number of hits for a lookup query against one or more second knowledge data bases is determined. One or more common terms of the set of common terms with the smallest number of hits are determined and a result is returned. The result comprises the one or more common terms with the smallest number of hits as one or more candidate classes for classifying the set of data values.

In a further aspect, the invention relates to a computer system for classifying a set of data values. The computers system is configured to determine, for each of the data values of the set of data values, a set of one or more terms associated with the respective data value using one or more first knowledge bases. A set of common terms is determined. The set of common terms comprises terms present in more than one of the sets of terms. For each of the common terms, a number of hits for a lookup query against one or more second knowledge data bases is determined. One or more common terms of the set of common terms with the smallest number of hits are determined and a result is returned. The result comprises the one or more common terms with the smallest number of hits as one or more candidate classes for classifying the set of data values.

BRIEF DESCRIPTION OF THE DRAWINGS

In the following, embodiments of the invention are explained in greater detail, by way of example only, making reference to the drawings in which.

DETAILED DESCRIPTION

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect of increasing the rate of data values which can be successfully classified. Thus, the understanding that a user has on the data may be increased. Embodiments may for example be based on the lookup of generally available knowledge in form of knowledge bases. In particular embodiments may allow to automatically determining the class or a hierarchy of classes most suitable to categorize the respective data values.

Embodiments may not require to prepare in advance of the classification process a definition of all the data classes to be searched. Nor is it required to provide a logic or examples of data values to be used by the computer system to find data values matching those data classes. Thus, it may be efficiently and effectively prevented that set of data values, like e.g. complete columns of a data table, are not going to be classified at all. In known approaches for data classification, it may happen that a set of data values is not classified, because it is too time consuming or not possible at all to prepare in advance a logic to detect the class of all data sets to be classified. Furthermore, it may be prevented that large numbers of data values comprised by a data set to be classified are ignored for the classification, since no logic has been prepared to suitably handle the respective data values. In known approaches for data classification, it may be required to limit the classification to a well-chosen small set of data classes which are known to be potentially relevant for a particular data governance process, while leaving all data values which do not fit any of the known data classes as unconsidered. Embodiments may rather allow to take into account all data values of a data set to be classified and use even data classes which in advance are unknown to be potentially relevant.

Embodiments may have the beneficial effect of improving data classification. An improved data classification may be supportive for determining the further processing of a set of data values. Based on the result of the classification it may e.g. be decided whether and how to mask the respective data values, to define data quality expectation and/or to decide who is allowed to use the respective data values.

In case of a classification using a regular expression, list of reference values or a custom logic that is specific for each data class of a predefined set of data classes expected to be found, for each tested data value a true/false decision may be received on whether the data value matches one of the predefined classes or not. For example, an email address is a data value which must verify a particular regular expression. Compared to this approach, embodiments may have the beneficial effect of being able to use classes which are not predefined, i.e. known in advance to be potentially relevant. The classes used for the classification are rather dynamically determined during the classification process itself.

In case a custom logic is used for classification which compares metadata of data fields comprising data values to be classified with some expectation set of metadata for each data class of a predefined set of data classes expected to be found, the data values may only be assigned to one of the predefined classes or no classes. Compared to this approach, embodiments may have the beneficial effect of being able to use classes which are not predefined, i.e. known in advance to be potentially relevant. The classes used for the classification are rather dynamically determined during the classification process itself. The same holds true in view of a fuzzy logic used for classification which may only be able compare the characteristics (fingerprint) of the data values to be classified with characteristics of predefined data values belonging to data classes of a predefined set of data classes expected to be found.

Data classification refers to identifying to which class or category a set of data values belongs.

A knowledge base refers to a set of data storing complex structured and unstructured information used by a computer system. A knowledge base may comprise information about terms, like e.g. definitions of terms. According to embodiments, these terms may be used to classify data values.

Knowledge bases used according to embodiments may comprise public domain data sources, such as dictionaries, Wikipedia/DBpedia or a web search performed by a search engine in general. Furthermore, knowledge bases may comprise indexed private data sources containing annotated structured data or unstructured data. Embodiments may look up for each data value to be classified what terms are comprised by a search result, when querying the private or public knowledge base for that value.

A 'term' refers to a word or a combination of words. For example, a term may be a noun or compound noun. As other examples, a term can be any other word or combination of words, where the word(s) can be a noun, a compound noun, an adjective, a verb, and so forth.

A 'data value' refers to a combination of qualitative or quantitative variables, like e.g. a combination of alphanumeric signs. Data values are for example words, numbers, combinations of words, combinations of numbers or combinations of words and numbers.

According to embodiments, the classification may be parallelized using massive scalable clusters.

According to embodiments, the result exclusively comprises the one or more common terms with the smallest number of hits. Embodiments may have the beneficial effect that a specific single result is provided. This may result may be used for automatically further processing the set of data values using the result to determine the further processing steps. In case of an unambiguous single classification result, no further measures are required to determine the class of the respective set of data values to be classified.

According to embodiments, the determining of the one or more common terms with the smallest number of hits comprises determining an order list of common terms. The order list of common terms comprises the common terms of the set of common terms ordered according to their respective numbers of hits. According to embodiments, the result comprises the ordered list of common terms. The order list represents a candidate hierarchy of candidate classes for classifying the set of data values. Embodiments may have the beneficial effect that a plurality of possible classification results is provided based on which a most suitable class may be determined. Determining a most suitable class may for example depend on the possible alternatives for further processing. For example, a limited set of possible action for further processing of the set of data values may be provided. Each of the actions may be assigned to one or more classes. Using the ordered list of common terms, the same may be queried starting with common term with the smallest number of hits for a common term which is unambiguously comprised by a single one of the predefined classes of actions for further processing.

According to embodiments, the result comprises an excerpt from the ordered list of common terms. The excerpt comprises common terms with numbers of hits smaller than a maximum number of hits. Embodiments may have the beneficial effect that a most suitable class may efficiently and effectively be determined taking advantageous of the fast that the excerpt comprises most recommended class candidates which represent the most specific classes.

According to embodiments, the method further comprises extending the number of terms of one or more of the set of terms. For each term of each set of terms it is queried for one or more additional terms. The additional terms are generalizations or synonyms of the respective term. If an additional term is found, the respective additional term is added to the respective set of terms. According to embodiments, one or more of the following are queried for additional terms: an ontology, a taxonomy, a glossary. Embodiments may have the beneficial effect that by taking into account generalizations or synonyms of the terms, when determining the set of terms, the probability of finding common terms, which are present in a plurality of sets of terms, may be increased. Thus, it may be avoided that relevant common terms may be missed due to the fact that each set of terms comprises a different synonym of a relevant term or due to the fact that each set of terms comprises a different specification of a relevant term.

According to embodiments, the method further comprises reducing the number of common terms comprised by the set of common terms. For each of the common terms it is determined whether the common term is a generalization of another one of the common terms comprised by the set of common terms. The respective common term is deleted from the set of common terms if it is determined to be a generalization.

Since a high number of terms may be determined for each of the tested data values using the first one or more knowledge bases, embodiments may first collect all the findings for all the data values of the set of data values to be classified. Then the terms which are common to most of the data values may be determined and a corresponding set of common terms may be determined. The number of common terms may further be reduced by determining which of these terms are the most specific ones. By doing this, embodiments, may mimic what the human brain does, when seeing for instance a set of famous book authors. The general knowledge of a human may first recognize that all the values are person names and notice the pattern that they are also all known authors and conclude that the set of data values corresponds to a list of book authors, because "book authors" is more specific than "Person" but still describes all the evaluated data values. According to embodiments, for the determining whether the common term is a generalization one or more of the following is used: an ontology, a taxonomy, a glossary.

According to embodiments, for each of the common terms it is in sequence determined whether the common term is a synonym of one of the remaining common terms comprised by the set of common terms. The respective common term is deleted from the set of common terms if it is determined to be a synonym. Embodiments may have the beneficial effect that the number of common terms to be considered for determining the result of the classification may efficiently be reduced without any significant loss of information. According to embodiments, for the determining whether the common term is a synonym one or more of the following is used: an ontology, a taxonomy, a glossary.

According to embodiments, the set of common terms exclusively comprises terms present in at least a minimum number of the sets of terms. The minimum number is larger than one. Embodiments may have the beneficial effect that the larger the minimum number is chosen, the smaller the number of common terms to be considered for classification may become. For example, the minimum number may be adjusted such that either the number of common terms becomes smaller than a predefined threshold or that the minimum number becomes equal the number of sets of terms, i.e. the number of data values comprised by the set of data values to be classified. According to embodiments, the minimum number is equal to the number of sets of terms.

According to embodiments, the one or more second knowledge data bases are identical to the one or more first knowledge bases. According to embodiments, at least one of the one or more second knowledge data bases is different from the one or more first knowledge bases.

According to embodiments, the computer program product further comprises computer-readable program code configured to implement any of the embodiments of the method for classifying a set of data values secured register descript herein.

According to embodiments, the computer system further is configured to execute any of the embodiments of the method for classifying a set of data values secured register descript herein.

Figure 1:
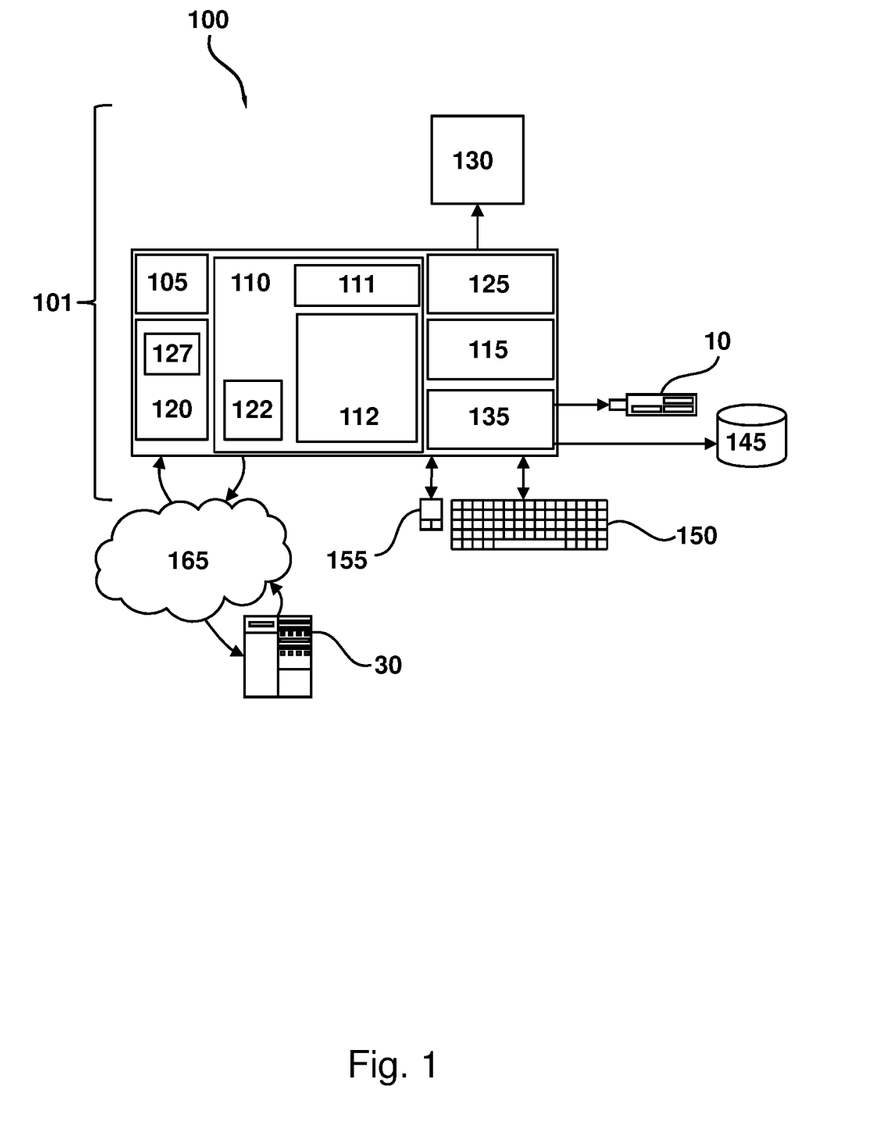
FIG. 1 depicts an exemplary computer system suited for implementing the data classification.

FIG. 1 depicts a computer system 100 suited for implementing a method for classifying a set of data values. It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions or software 112, e.g. configured to implementing a method for classifying a set of data values.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. The software 112 may e.g. implement classification of sets of data values. When a source program, then the program needs to be translated via a compiler, assembler, interpreter, or the like, which may or may not be included within the memory 110, so as to operate properly in connection with the OS 111. Furthermore, the methods can be written as an object-oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The storage 120 may comprise a knowledge base 127. Although the knowledge base 127 is shown as part of the storage 120, the knowledge base 127 may be stored in other storages that that can be accessed by the computer 101. For example, the knowledge base 127 may be stored on the external systems 30 or I/O devices 145. The knowledge base 127 may be a private knowledge base or a public knowledge base provided by computer 101 or downloaded by computer 101. The knowledge base 127 or an additional knowledge base may be a public knowledge base accessible via the external systems 30.

Figure 2:
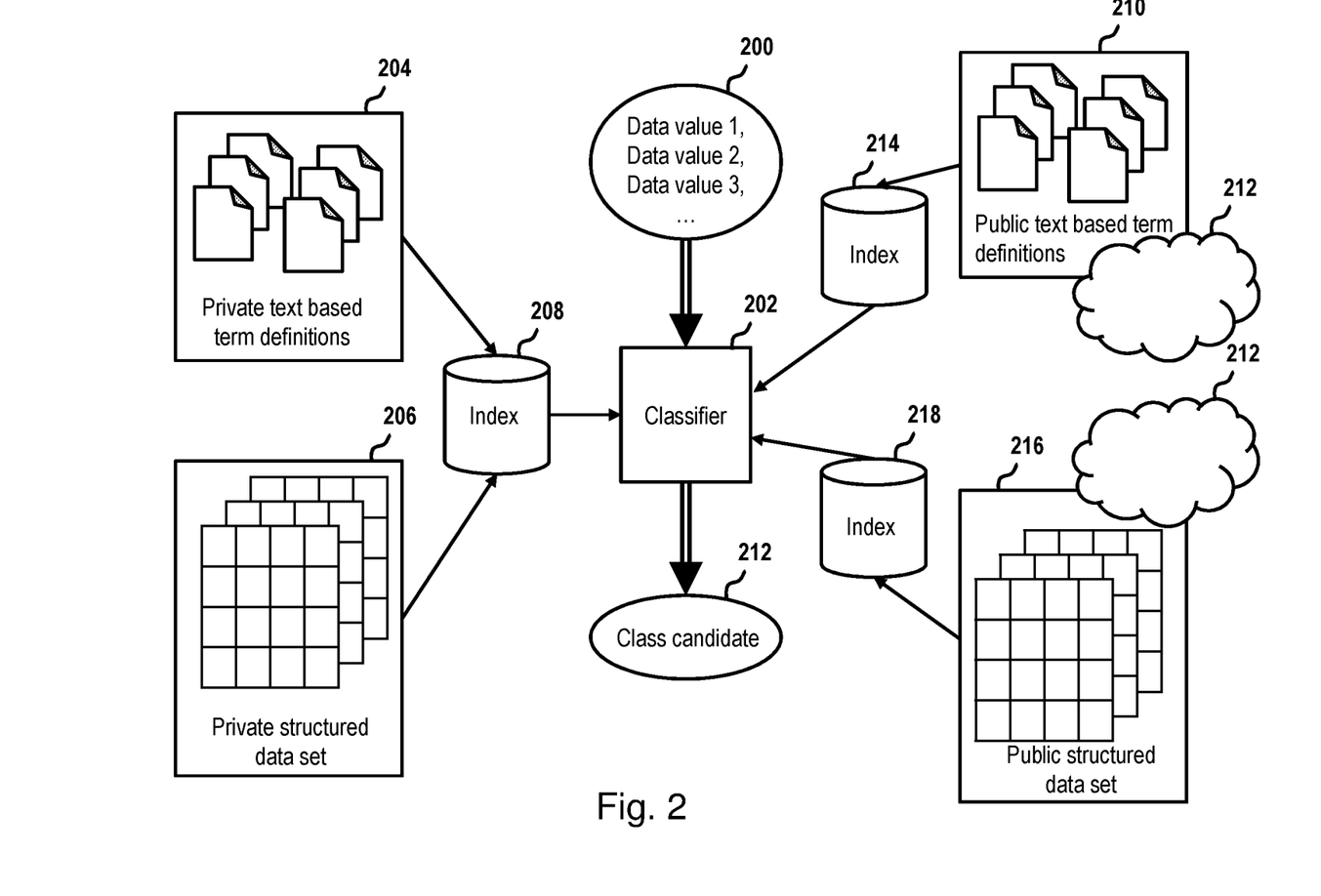
FIG. 2 depicts a schematic flow diagram of an exemplary data classification.

FIG. 2 depicts an exemplary method for classifying a set of data values 200. The set of data values 200 comprises a plurality of data values. These data values may for example be "blue", "red", "yellow", and "orange". The classifier 202 may be provided by a computer system executing computer-readable code configured for implementing a method for classifying a sets of data values, like set 200. The classifier may be provided in form of the computer system 100 of FIG. 1. As a result of the classification, classifier 202 may provide a class candidate 212 or a set of class candidates, e.g. in form of an ordered list.

The classifier 202 may use nonpublic knowledge bases 204, 206 as sources of terms that may already exist, e.g. in a database of an enterprise. Such nonpublic knowledge bases 204 are for instance unstructured text that can provide some definitions to some terms. Such nonpublic knowledge bases 206 may further be structured data sets, where data fields comprising data values have already been associated to a list of terms by some users or some process. The system may index the information provided by these nonpublic knowledge bases 204, 206, e.g. using a Solr index for instance. The information of the unstructured texts of knowledge bases 204 may e.g. be preprocessed by some text analytics application extracting structured information from the unstructured text. Alternatively, or additionally, the unstructured texts may be prepared by removing non-significant words, i.e. filling word, indexing the remaining words and associate them to the term they define. The structured information provided by knowledge bases 206 may be indexed by associated all the data values comprised by the data fields of the structured sets of data values to the term(s) associated to the respective data fields.

Furthermore, the classifier 202 may use public knowledge bases 210, 216 as sources of terms. These public knowledge bases 210, 216 may for instance be accessible via one or more networks 212, like e.g. the Internet. The public knowledge bases 210, 216 may as well comprises structured or unstructured information. Examples of unstructured sources 210 may be dictionaries, like e.g. the Oxford dictionary, encyclopedias, like e.g. Wikipedia, individual texts found by performing a web search using a search engine or a list of results of such a web search itself. Example of structured sources 216 may be open linked data like DBpedia, providing a large knowledge base in a triplet format, e.g. RDF, as well as an ontology linking domains with each other. Some public sources 210, 216 may be only accessible through a web service, leaving the query/index mechanism on the site of the third-party server, like e.g. a search engine, public dictionaries etc. Some other sources 210, 216 may be replicated on site and indexed with the same indexing methods used for the private sources 204, 206.

Figure 3:
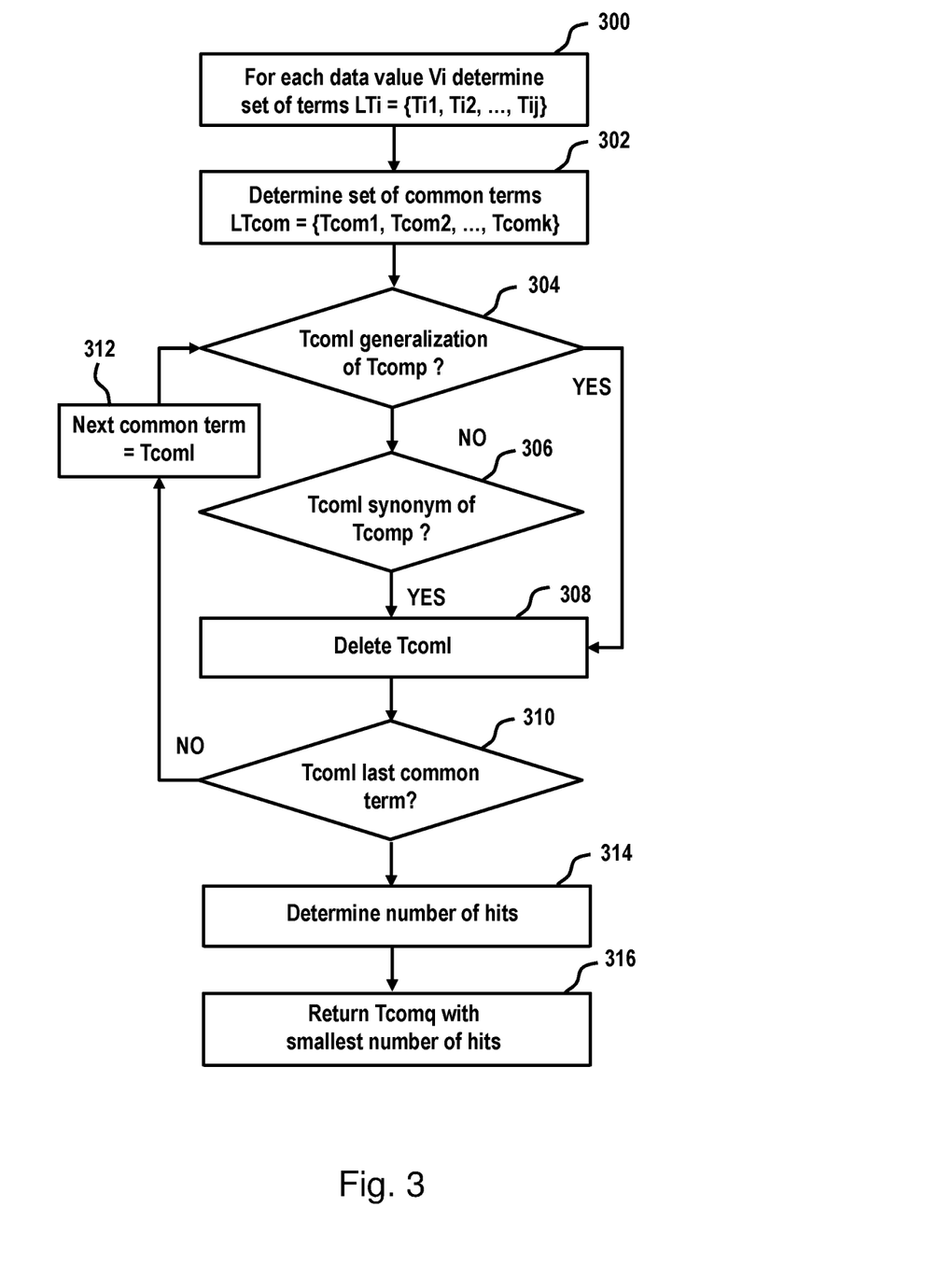
FIG. 3 depicts a schematic flow diagram of an exemplary data classification.

FIG. 3 depicts an exemplary method for classifying a set of data values, e.g. using the infrastructure of FIG. 2. In step 300, for each data value Vi of a set of data values to be classified one or more of the knowledge databases of FIG. 3 are looked up. For each of the data values Vi a set of terms $LT_i = \{T_{i1}, T_{i2}, \ldots, T_{ij}\}$ is determined. Each of the terms of $LT_i$ may be associated to Vi. For instance, the lookup of the data value "blue" may return the terms "color" and "English band" among other terms. "Red" may return the terms "movie" and "color". "Yellow" may return "app name" and "color". "Orange" may return "color", "fruit", and "company". According to embodiments, step 330 may further comprise: For each term Tij returned by the one or more knowledge bases for a data value Vi, one or more additional terms which are generalizations or synonyms of the term Tij are determined and added to the set of terms LTi for Vi. For instance, if one data value is associated with the term "actor" and another data value with the term "author", taking into account generalizations and synonyms may result in the additional term "person". Thus, adding generalizations and synonyms may return the set of terms {actor, person} for the first data value and the set of terms {author, person} for the second data value. When later on identifying common terms, the common term "person" may be determined. Without taking into account such synonyms and generalizations of the terms Tij comprised by the sets of terms LTi potentially relevant common terms could be missed. In step 302, the classifier may go through each of the list of terms LTi for each of the data values Vi determined in the previous step and determine a set of common terms LTcom={Tcom1, Tcom2, ... Tcomk}, which are present in most of the terms. According to embodiments only terms present in each of the sets of terms may be kept. According to further embodiments, a term may even if it is not present in all LTi, but in most of them. This may have the beneficial effect of being tolerant against data quality problems or lack of standardization in the looked-up knowledge bases. In the previous simplistic example, LTcom may simple be LTcom={color}. In step 304, for each of the common terms Tcom1 comprised by LTcom it may be checked in one or more local or public ontologies, taxonomies or glossaries, if common term Tcom1 is a generalization of any other common term of Tcomp of LTcom. on. If this is the case, the common term Tcom1 is deleted in step 308, i.e. removed from the set of common terms LTcom and the method is continued for the remaining common terms comprised by the reduced set of common terms LTcom. Furthermore, in case Tcom1 is no generalization of any other common term Tcomp, it may be checked in step 306 whether the respective common term is a synonym of any other term Tcomp of LTcom. If this is the case, remove Tcom1 is deleted in step 308. In step 310, it may be checked, whether Tcom1 was the last term of the reduced set of common terms LTcom. If there is a common term remaining, the respective common term is handled like Tcom1 before in steps 304 to 310.

In case Tcom1 is the last common term of the reduced set of common terms LTcom, the method is continued in step 314 with determining for each of the remaining common terms a number of hits using one or more knowledge bases. For example, the knowledge data bases of FIG. 2 may be queried for each of the respective common terms. This may e.g. comprise querying the indexes 208, 214, 218 and/or a simple web search. According to embodiments, the order of steps 304 and 308 may be interchanged. In step 316, with common term with the smallest number of hits is returned as a result of the classification, i.e. as a candidate class for classifying the set of data values.

Figure 4:
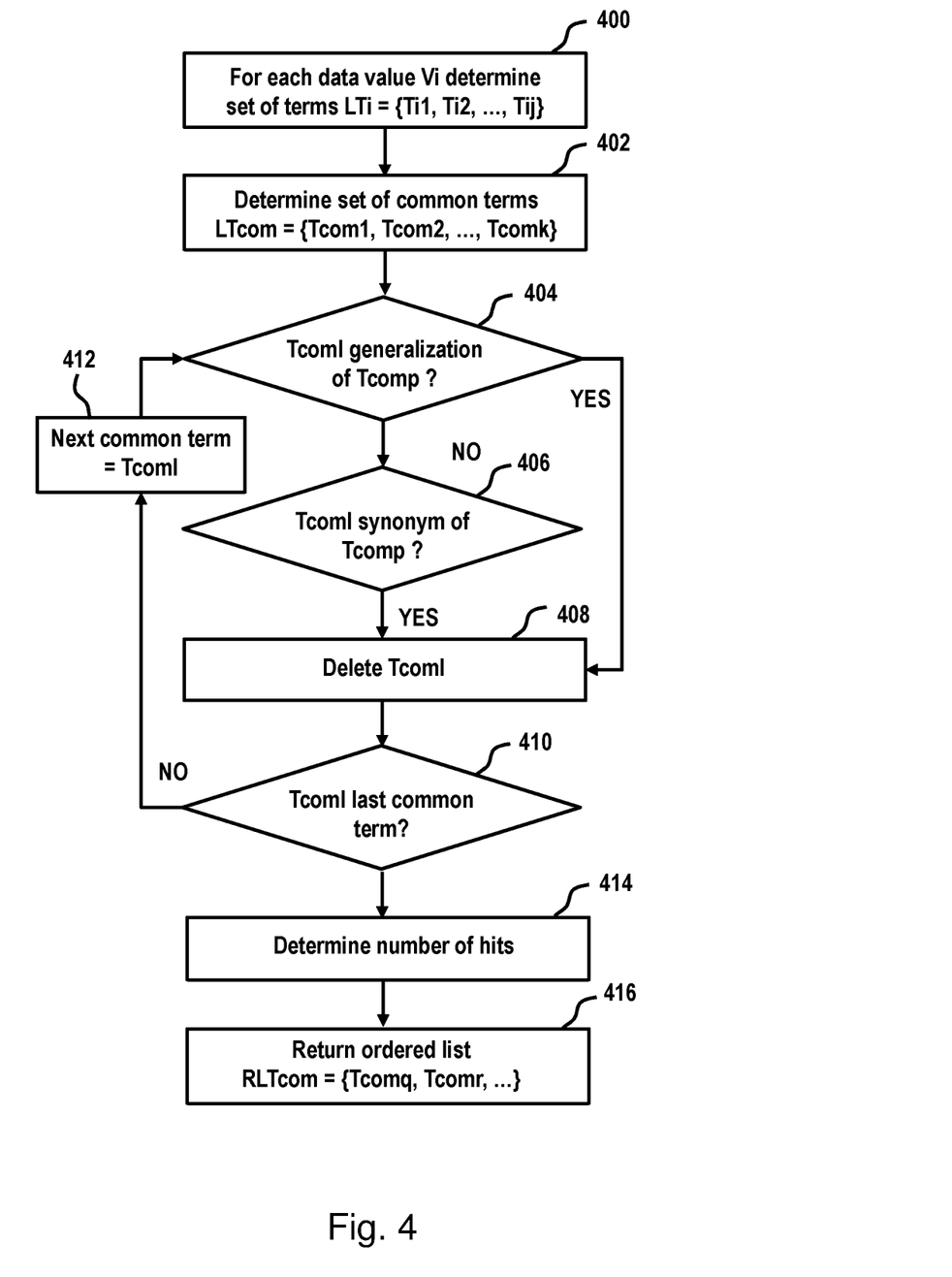
FIG. 4 depicts a schematic flow diagram of an exemplary data classification.

FIG. 4 depicts a further exemplary method for classifying a set of data values. Steps 400 through 412 are identical to steps 300 to 312 of FIG. 3. Only steps 414 and 416 may differ. In step 414, not only the numbers of hits may be determined, but the remaining common terms may further be ordered according their respective numbers of hits. For example, the remaining common terms may be ordered in in ascending order. In step 416, an ordered list RTLcom={Tcomq, Tcomr, ... } of possible common terms, i.e. classes, is returned as a result. For example, the common terms with lower numbers of hits are recommended first, i.e. located at the beginning of the list, because they represent more specific classes.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for classifying a set of data values, the method comprising:
   determining, for each of the data values of the set of data values, a set of one or more terms associated with the respective data value using one or more first knowledge bases,
   determining a set of common terms, the set of common terms comprising terms that are present in all of the sets of one or more terms,
   for each term of the set of common terms, querying a second knowledge data bases and determining a number of hits returned from the query,
   identifying one or more common terms of the set of common terms with the smallest number of hits by creating an ordered list of the one or more common terms, the ordered list of common terms comprising the common terms of the set of common terms in ascending order according to their respective numbers of hits, the order list representing a candidate hierarchy of candidate classes for classifying the set of data values wherein a lower value of the respective numbers of hits for each term is indicative of a more specific candidate class; and
   returning a result comprising an excerpt from the ordered list of common terms, the excerpt comprising common terms with the number of hits smaller than a maximum number of hits, wherein each term in the result is a candidate class for classifying the set of data values.

2. The method of claim 1, the result exclusively comprising the one or more common terms with the smallest number of hits.

3. The method of claim 1, further extending the number of terms of one or more of the sets of terms, the extending comprising for each term of each set of terms: querying for one or more additional terms, the additional terms being generalizations or synonyms of the respective term,
   if an additional term is found, adding the respective additional term to the respective set of terms.

4. The method of claim 3, one or more of the following being queried for additional terms: an ontology, a taxonomy, a glossary.

5. The method of claim 1, further comprising reducing the number of common terms comprised by the set of common terms, the reducing comprising for each of the common terms: determining whether the common term is a generalization of another one of the common terms comprised by the set of common terms,
   deleting the common term from the set of common terms if it is determined to be a generalization.

6. The method of claim 5, using for the determining whether the common term is a generalization one or more of the following: an ontology, a taxonomy, a glossary.

7. The method of claim 5, the reducing further comprising for each of the common terms in sequence:
   determining whether the common term is a synonym of one of the remaining common terms comprised by the set of common terms,
   deleting the common term from the set of common terms if it is determined to be a synonym.

8. The method of claim 7, using for the determining whether the common term is a synonym one or more of the following: an ontology, a taxonomy, a glossary.

9. The method of claim 1, the set of common terms exclusively comprising terms present in at least a minimum number of the sets of terms, the minimum number being larger than one.

10. The method of claim 9, the minimum number being equal to the number of sets of terms.

* * * * *